Sept. 24, 1957 R. D. HELFRICH 2,807,128
NUT HARVESTING APPARATUS
Filed April 6, 1956 3 Sheets-Sheet 2
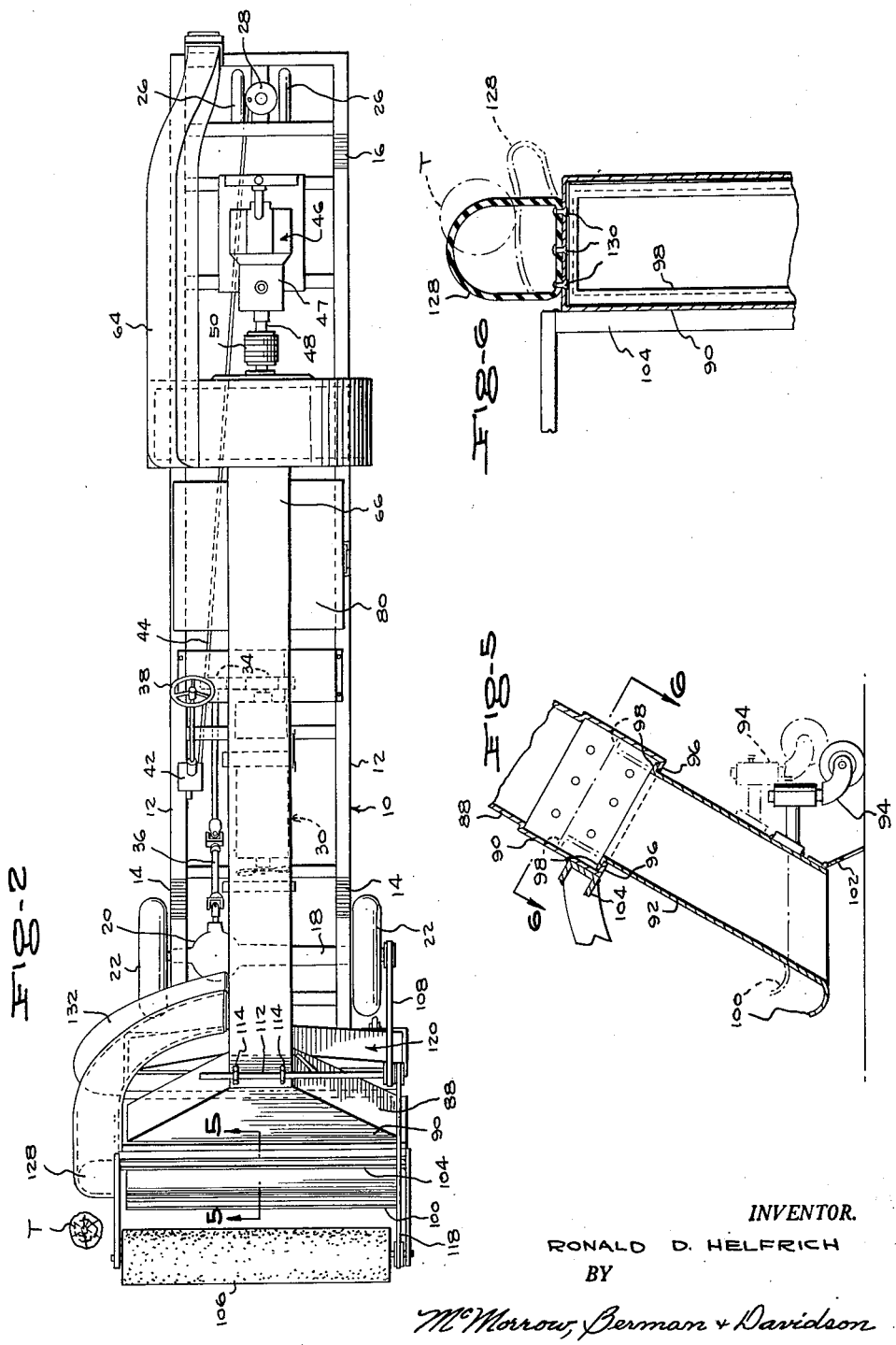
INVENTOR.
RONALD D. HELFRICH
BY
McMorrow, Berman & Davidson
ATTORNEYS

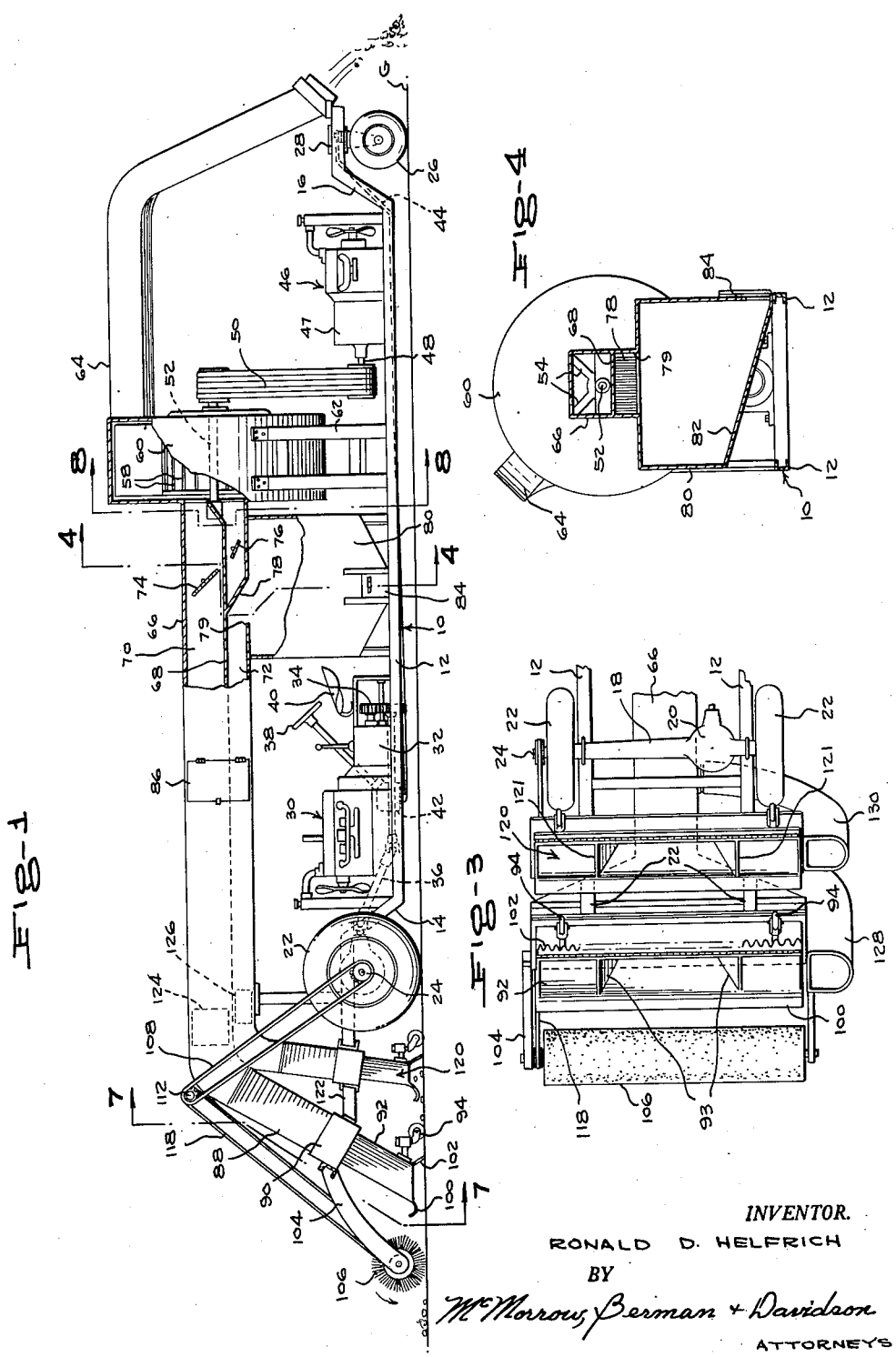

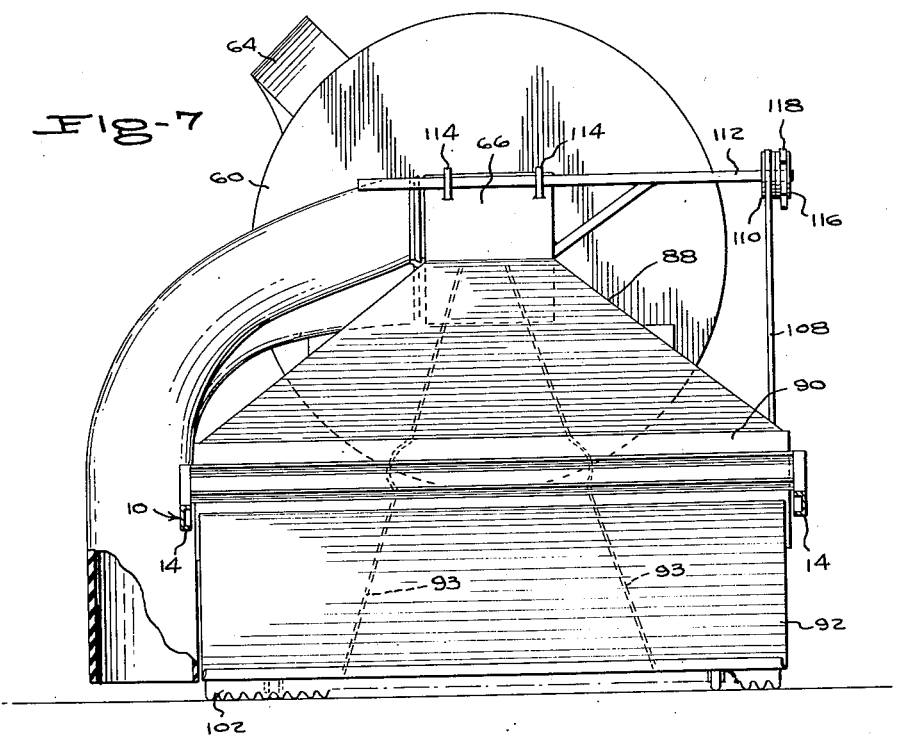
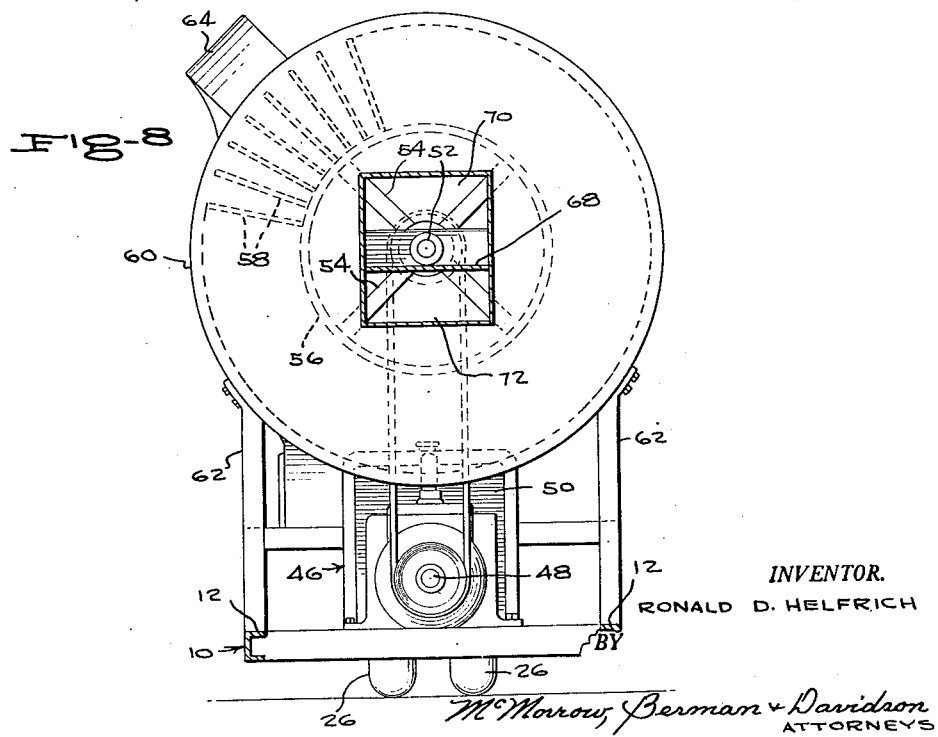

United States Patent Office 2,807,128
Patented Sept. 24, 1957

2,807,128
NUT HARVESTING APPARATUS
Ronald D. Helfrich, Beaverton, Oreg.
Application April 6, 1956, Serial No. 576,584
4 Claims. (Cl. 56—328)

This invention relates to mobile apparatus used for harvesting nuts after the same have dropped to the ground.

The harvesting of nuts is a task which is rendered difficult by the fact that the nuts are so shaped, and are of such a size, as to resist being picked up by ordinary pick-up-devices. Further, intermingled with the nuts on the ground are leaves and other trash, and following a substantial amount of rainfall, many of the nuts are packed into the soft earth.

The problem is one which needs solution, due to the fact that hand-harvesting methods, or methods making use of relatively small, mechanically operating pick-up devices, cannot be employed with suitable economy, particularly when nuts falling to the ground from trees in a large grove must be harvested.

Still further, the arrangement of the trees of the grove in rows renders difficult the harvesting of nuts that are in direct alignment with the row of trees, that is, are in so-called "blind spots" not ordinarily capable of being traversed by a mobile harvesting machine traveling between adjacent rows of trees.

The main object of the present invention is to provide a harvesting machine which will obviate the difficulties which have heretofore persisted. In this connection, it is proposed to provide a machine which will be adapted to first dislodge nuts that may have been partially embedded in the soft earth, second, will act upon the nuts and the trash in such a manner as to remove the trash while leaving the nuts, and third, will pick up the nuts remaining after removal of the trash and will deposit them in a receptacle provided upon the machine.

A more specific object is to provide a harvesting machine of the type referred to that will be adapted to pick up nuts disposed in the mentioned "blind spots" without departure of the machine from its straight path of travel along a row of trees.

Still another object is to provide a machine as described which will be economical of operation, and further, considering the benefits to be obtained from the use thereof particularly in large groves, will be relatively inexpensive of construction.

Still another object is to provide a machine of the type referred to which will require the attendance only of the machine operator, so that by one-man operation, a substantial quantity of nuts can be picked up in a minimum amount of time.

Still another object is to provide a machine as stated which will operate on relatively rough terrain, and will further operate efficiently on ground which is not rolled to a full smoothness.

Still another object is to provide a machine as described which will be highly maneuverable, so as to permit it to be maneuvered readily at the end of a row, to proceed down the next adjacent row of trees.

Other objects will appear from the following description, the claims appended thereto, and from the annexed drawings, in which like reference characters designate like parts throughout the several views, and wherein:

Figure 1 is a side elevational view of a machine formed according to the present invention, portions being broken away and shown in section;

Figure 2 is a top plan view of said machine;

Figure 3 is a fragmentary bottom plan view showing the head end of the machine;

Figure 4 is a transverse section on line 4—4 of Figure 1;

Figure 5 is a detail sectional view, on an enlarged scale, of the trash removal duct, showing the head end of the same in different positions of adjustment illustrated in full and dotted lines respectively;

Figure 6 is an enlarged, detail sectional view on line 6—6 of Figure 5, the full and dotted lines showing a flexible auxiliary duct in normal and deformed conditions respectively;

Figure 7 is an enlarged transverse sectional view through the machine taken substantially on line 7—7 of Figure 1; and Figure 8 is an enlarged transverse sectional view through the apparatus on line 8—8 of Figure 1, showing the blower.

Referring to the drawings in detail, the machine includes an elongated, relatively low frame generally designated by the reference numeral 10. The frame includes elongated, horizontally disposed side frame members 12 formed at their leading ends with upwardly offset end portions 14 and at their trailing ends with upwardly offset portions 16. Cross braces are provided at locations along the length of the side rails, to provide a support for the components of the apparatus and also to provide a suitable bracing of the frame construction.

Connected to the upwardly offset front end portions 14 is an axle housing 18 (Figure 2) provided adjacent one end with a differential 20. Front wheels 22 are mounted upon a drive axle 24.

At the rear end of the machine, closely spaced steerable rear wheels 26, smaller in diameter than the front or drive wheels 22, are provided, the rear wheels being disposed inwardly from the respective side frame members. The rear wheels are connected to an axle carried by the lower end of a vertical spindle depending from a turntable 28 rotatably mounted upon the rear end of the frame 10, so that on rotation of the turntable in a selected direction, the wheels 26 will be moved about the axis of the spindle for the purpose of steering the apparatus.

From the description so far provided, it will be seen that the vehicle includes an elongated frame the intermediate portion of which is disposed in closely spaced relation to the ground G, with said frame having upwardly offset end portions. It will further be seen that the frame is rollably mounted upon large, front drive wheels and upon small, steerable rear wheels.

Reference should now be had to Figures 1 and 2, for the means to drive the front wheels. This includes an internal combustion engine 30, the shaft of which extends into a conventional transmission 32. At the output side of the transmission 32 there are provided meshing gears 34, adapted to drive an articulated drive shaft 36 (Figure 2) extending close to the right side (considering the same as viewed by the vehicle operator) of the frame. The drive shaft 36 extends to the differential 20 and is drivingly linked in a suitable manner to the drive axle, so as to drive the machine at a selected rate of speed.

Considering now the means for steering the vehicle, there is provided a steering wheel 38 also disposed at the right side of the frame viewing the same as seen by an operator supported upon a seat 40 adjacent the steering wheel. The steering column extends into a gear box 42 or other means for imparting axial reciprocating movement to an elongated rod 44 extending from steering box 42 to the turntable. Rod 44 is connected to the turntable adjacent the periphery thereof so that on movement of the rod 44 axially in opposite directions, the turntable will be rotated in correspondingly opposite directions to steer the vehicle in a selected direction.

The apparatus includes a blower means for creating a suction in the pick-up conduits, and for discharging trash at the rear of the vehicle. Said blower means is powered by a blower drive motor 46 disposed immediately forward of the upwardly offset rear end portions 16 of the side frame members. The motor 46 has associated therewith a transmission 47, from which forwardly projects a shaft 48 to which are secured pulleys about which are trained belts 50. Belts 50 extend upwardly and are trained about driven pulleys mounted upon one end of a horizontally disposed blower fan shaft 52.

Referring to Figure 8, sleeved on and secured to shaft 52 is a core or sleeve of a blower including radial spokes 54 extending outwardly from the sleeve and secured to a drum 56 from which radial fan blades 58 extend. On rotation of the blower in the proper direction, a suction is caused tending to pull air into the front wall of the blower housing 60 and force the same out of the side wall thereof. The blower housing is supported upon standards 62 projecting upwardly from the side frame members.

The blower outlet, formed in the side wall of housing 60, is in communication with the intake end of an exhaust duct 64, extending rearwardly from the blower housing and discharging at the back end of the frame.

The inlet to the fan is disposed centrally in the front wall of blower housing 60, and is in communication with the rear end of an elongated duct 66 longitudinally partitioned at 68 to provide a trash duct 70 and a nut duct 72 disposed below the trash duct. Both the trash and nut ducts are in communication with the interior of the fan at their rear ends, so that on operation of the blower, a strong suction will be created both in the trash duct 70 and in the nut duct 72.

To control the air flow through the respective ducts, there are provided dampers 74, 76 disposed adjacent the rear ends of the ducts (see Figure 1).

When a suction is set up in the nut duct 72, nuts will be caused to travel in the air current, toward the blower, but are prevented from entering the blower due to the provision of an inclined grill 78 composed (see Figure 4) of parallel bars and extending across the full area of the nut duct.

The grill 78 is disposed at the back edge of a hopper inlet opening 79 (Figure 1) which as shown in Figure 4 opens into the upper portion of a hopper 80 supported in front of the blower housing and having an inclined floor 82 along which the nuts will gravitate to one side of the hopper, so that they can be removed through an opening normally closed by a vertically slidable gate 84.

Intermediate their ends, the ducts 70, 72, are provided with an access door 86 (Figure 1) common to both the ducts, the purpose of this door being to permit access to the duct interiors for the purpose of washing the same clear of mud, etc.

At its front end, duct 70 opens into the smaller upper end of a tapered inlet portion 88.

As seen from Figure 2, inlet portion 88 extends substantially the full width of the device. This is also shown in Figure 7 to particular advantage.

At its lower, wider end, the inlet portion 88 has a rectangular extension 90, and telescoping in said extension is a hollow head 92 of rectangular cross section extending the full width of extension 90 as shown in Figure 7. In the head are mounted transversely spaced, upwardly converging partitions 93, to evenly distribute the air suction across the bottom. These extend fully to the upper ends of inlet portion 88, and have flexible joints intermediate their ends, to permit the described telescopic action.

Head 92 has secured thereto brackets extending rearwardly from the head and swiveled in the brackets are casters 94 supporting the lower or inlet end of the head in spaced relation to the ground surface.

Extension 90 at its lower end has an inwardly directed peripheral flange 96, and supported upon said flange is an outwardly directed flange 98, provided upon the upper end of the head 92.

Head 92 is thus slidably telescoped in extension 90, and can move inwardly of the extension 90 whenever the casters rise on engaging obstructions such as stones, mounds of earth, etc.

Formed upon the front wall of the head 92 is an upwardly curved shoe 100 extending the full width of the head, to prevent nuts from being cut by or impaled upon the front edge of the head 92. Hingedly connected to the rear edge of the inlet opening of head 92 is a rearwardly swingable flap 102, the lower edge of which is serrated as best shown in Figure 7. This is adapted to be swung rearwardly by nuts passing under the inlet duct head 92, and at the same time deters loose, relatively light trash such as nut hulls, leaves, etc. so that said trash will be subjected to the full suction within the head 92 and will be drawn upwardly in said head.

Duct 70, together with its associated inlet portion 88 and head 90, constitutes a trash passage, and on the setting up of suction within said duct, trash will be sucked up into the head 92 and will pass to the blower, said trash being forced by the blower into the exhaust duct 64 and being discharged at the rear end of the machine. In this way, all the trash is removed from the nuts, before the nuts are brought into the apparatus.

The separation of the trash from the nuts, before the nuts can be acted upon by the harvesting machine, has the desirable characteristic that there is no necessity of effecting said separation within the apparatus itself, so that a clean harvest is picked and deposited in the hopper 80 with the greatest portion of the debris removed from the harvested nuts.

Welded to the front surface of the extension 90 of the inlet portion 88 is the bight portion of the U-shaped yoke 104, and journalled in the front ends of the legs of said yoke is a shaft of a rotary brush 106 rotated in contact with the ground surface in advance of the trash duct head 90.

To drive the brush, a belt 108 is trained about a pulley carried by one end of the axle 24, said belt (see Figures 1 and 7) extending upwardly and being trained about a pulley 110 mounted upon shaft 112 extending horizontally, transversely of the apparatus and rotating in bearings 114 mounted upon the front end of the duct 70.

Also secured to the shaft 112 for rotation therewith is a pulley 116 about which is trained a belt 118 extending forwardly, downwardly to a pulley mounted upon the brush shaft.

It will be understood that the brush can be removed whenever desired, and ordinarily the brush would not be used if the ground is dry and there is no danger of the nuts having been packed into the ground.

When, however, the ground is soft and there is a substantial possibility of the nuts being partially embedded in the ground, the brush 106 is used, and rotates in contact with the ground, so as to dislodge the embedded nuts.

The brush, as will be understood, rotates in a counterclockwise direction, viewing the same as in Figure 1, so that the dislodged nuts are driven backwardly therefrom to be disposed in the path of the heads of the ducts.

At the head end of the nut duct 72, there is provided a tapered, wide inlet end portion similar to the portion 88, and telescoping in the inlet end portion of the nut duct is a hollow head 120 extending the full width of the apparatus a short distance in back of the head 90 of the trash duct. Head 120 has partitions 121 similar to partitions 93. At its lower end, the head 120 is equipped similarly to the trash duct with a forwardly projecting shoe and with a hinged, rake-like flap. Further, the head 120 is supported upon casters similar to those shown at 94.

To brace the head portions of the ducts in their proper position, there are provided short connecting braces 122 extending between the tapered portions of the ducts, and further, the front extremities of the upwardly offset forward end portions 14 of the side frame members are connected to the nut ducts at the lower end of the funnel-like inlet end portion thereof.

Formed in the side walls of the trash and nut ducts 70, 72 are openings 124, 126 respectively (see Figure 1) and connected in communication with said openings are the outlet ends of auxiliary trash and nut ducts 128, 132 respectively. As shown in Figure 6, the auxiliary duct 128 is connected to the adjacent side of the inlet end portion of the trash duct by means of rivets 130 or equivalent fastening elements, and it will be understood that the auxiliary nut duct 132 will be similarly connected to the inlet end portion of the nut duct.

The auxiliary ducts are of a soft rubber material or the like, and are adapted to normally be retained in the cross sectional shape shown in Figure 6. These project laterally, outwardly under these conditions, so as to have their inlet ends disposed in line with a row of trees T.

In this way, the auxiliary ducts pick up trash and nuts disposed in the so-called "blind spots" so that when the apparatus moves alongside a row of trees T, the auxiliary ducts will pick up nuts in the spaces between the trees of the row, as well as trash. The auxiliary ducts carry the trash and nuts to the trash and nut ducts 70, 72 respectively, and each time an auxiliary duct strikes a tree, it will be resiliently flexed to the dotted line position shown in Figure 6, until it passes the tree, after which it will spring back to its normal cross-sectional shape.

It will be seen that the apparatus formed according to the present invention permits one-man operation, and is adapted to pick up a great quantity of nuts, in a relatively small period of time. The apparatus is characterized by the substantial width of the area over which it will pick up nuts during a single passage of the apparatus along a row of trees. When the apparatus reaches the end of the row, it can be readily maneuvered to travel back along the row at the opposite sides thereof.

The apparatus is further characterized by the arrangement wherein all light trash is first sucked out of the nuts coating the ground, after which the nuts, with the trash removed therefrom, are themselves sucked up into the nut duct, in which there will be a stronger current of air capable of picking up objects of greater weight, as distinguished from the trash duct, in which the air current will be sufficient to pick up relatively light materials while not being sufficient to pick up heavier materials, such as the nuts themselves.

Further, it will be seen that the trash is continuously discharged from the machine rearwardly thereof, while the harvested nuts are deposited in the hopper for removal at periodic intervals.

Still further, the device picks up nuts in the blind spots, through the use of the rubber auxiliary ducts, and still further has the adaptability of dislodging nuts that are embedded in the ground, through the use of the rotary brush 106.

Another important characteristic of the machinery resides in its adaptability to traverse relatively rough ground. The heads of the respective ducts are adapted to telescope within the front end portions of the ducts as necessary, and further, by reason of their being equipped with the shoes and with the hinged flaps, prevent damage to the nuts while at the same time insuring the momentary retention of the nuts or trash, as the case may be, in the air current so that they will be entrained in the air current and drawn into the ducts.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. Apparatus for harvesting nuts comprising: an elongated, ground-supported, mobile frame; a main duct mounted upon the frame and extending in a fore-and-aft direction thereon in a position elevated above the ground surface, said main duct being partitioned longitudinally from end to end thereof to divide the same into a trash duct and a nut duct arranged in coextensive, side-by-side relation; a blower mounted on the frame at the aft end of the main duct and having an inlet communicating with the main duct so as to communicate with the aft ends of both the trash and nut ducts; front and rear suction heads mounted on and extending downwardly to the ground from the forward end of the main duct in positions spaced longitudinally of the frame for acting in following order on material to be picked up, the front suction head communicating with the forward end of the trash duct and the rear suction head with the forward end of the nut duct, the front suction head having an open, ground-adjacent, inlet end greater in area than the corresponding end of the rear suction head to develop less suction in the inlet end of the front suction head than in the inlet end of the rear suction head, thus to cause the front suction head to pick up lighter, trashy materials while leaving nuts to be picked up by the rear suction head; a hopper mounted on the frame in communication with the nut duct forwardly of the aft end of the nut duct; and a grill-like deflector extending across the nut duct in position to deflect nuts passing therethrough into the hopper.

2. Apparatus for harvesting nuts comprising: an elongated, ground-supported, mobile frame; a main duct mounted upon the frame and extending in a fore-and-aft direction thereon in a position elevated above the ground surface, said main duct being partitioned longitudinally from end to end thereof to divide the same into a trash duct and a nut duct arranged in coextensive, side-by-side relation; a blower mounted on the frame at the aft end of the main duct and having an inlet communicating with the main duct so as to communicate with the aft ends of both the trash and nut ducts; front and rear suction heads mounted on and extending downwardly to the ground from the forward end of the main duct in positions spaced longitudinally of the frame for acting in following order on material to be picked up, the front suction head communicating with the forward end of the trash duct and the rear suction head with the forward end of the nut duct, the front suction head having an open, ground-adjacent, inlet end greater in area than the corresponding end of the rear suction head to develop less suction in the inlet end of the front suction head than in the inlet end of the rear suction head, thus to cause the front suction head to pick up lighter, trashy materials while leaving nuts to be picked up by the rear suction heads; a hopper mounted on the frame in communication with the nut duct forwardly of the aft end of the nut duct; and a grill-like deflector extending across the nut duct in position to deflect nuts passing therethrough into the hopper, said inlet ends of the suction heads being elongated in directions transversely of the frame and being arranged in coextensive relation in positions to extend substantially from one to the opposite side of the frame.

3. Apparatus for harvesting nuts comprising: an elongated, ground-supported, mobile frame; a main duct mounted upon the frame and extending in a fore-andaft direction thereon in a position elevated above the ground surface, said main duct being partitioned longitudinally from end to end thereof to divide the same into a trash duct and a nut duct arranged in coextensive, side-by-side relation; a blower mounted on the frame at the aft end of the main duct and having an inlet communicating with the main duct so as to communicate with the aft ends of both the trash and nut ducts; front and rear suction heads mounted on and extending downwardly to the ground from the forward end of the main duct in positions spaced longitudinally of the frame for acting in following order on material to be picked up, the front suction head communicating with the forward end of the trash duct and the rear suction head with the forward end of the nut duct, the front suction head having an open, ground-adjacent, inlet end greater in area than the corresponding end of the rear suction head to develop less suction in the inlet end of the front suction head than in the inlet end of the rear suction head, thus to cause the front suction head to pick up lighter, trashy materials while leaving nuts to be picked up by the rear suction head; a hopper mounted on the frame in communication with the nut duct forwardly of the aft end of the nut duct; a grill-like deflector extending across the nut duct in position to deflect nuts passing therethrough into the hopper, said inlet ends of the suction heads being elongated in directions transversely of the frame and being arranged in coextensive relation in positions to extend substantially from one to the opposite side of the frame; and auxiliary trash and nut ducts respectively connected to the front and rear suction heads, the auxiliary ducts being formed with flexible walls and having inlet ends substantially in the planes of the inlet ends of the front and rear suction heads at one side of said suction heads, to form extensions of the respective suction heads at said one side thereof, in which extensions material may be picked up close to obstructions of substantial size contacted by and flexing the walls of the auxiliary ducts, the auxiliary ducts having discharge ends connected in communication with the trash and nut ducts rearwardly from the forward ends of the trash and nut ducts.

4. Apparatus for harvesting nuts comprising: an elongated, ground-supported, mobile frame; a main duct mounted upon the frame and extending in a fore-and-aft direction thereon in a position elevated above the ground surface, said main duct being partitioned longitudinally from end to end thereof to divide the same into a trash duct and a nut duct arranged in coextensive, side-by-side relation; a blower mounted on the frame at the aft end of the main duct and having an inlet communicating with the main duct so as to communicate with the aft ends of both the trash and nut ducts; front and rear suction heads mounted on and extending downwardly to the ground from the forward end of the main duct in positions spaced longitudinally of the frame for acting in following order on material to be picked up, the front suction head communicating with the forward end of the trash duct and the rear suction head with the forward end of the nut duct, the front suction head having an open, ground-adjacent, inlet end greater in area than the corresponding end of the rear suction head to develop less suction in the inlet end of the front suction head than in the inlet end of the rear suction head, thus to cause the front suction head to pick up lighter, trashy materials while leaving nuts to be picked up by the rear suction head; a hopper mounted on the frame in communication with the nut duct forwardly of the aft end of the nut duct; a grill-like deflector extending across the nut duct in position to deflect nuts passing therethrough into the hopper, said inlet ends of the suction heads being elongated in directions transversely of the frame and being arranged in coextensive relation in positions to extend substantially from one to the opposite side of the frame; and auxiliary trash and nut ducts respectively connected to the front and rear suction heads, the auxiliary ducts being formed with flexible walls and having inlet ends substantially in the planes of the inlet ends of the front and rear suction heads at one side of said suction heads, to form extensions of the respective suction heads at said one side thereof, in which extensions material may be picked up close to obstructions of substantial size contacted by and flexing the walls of the auxiliary ducts, the auxiliary ducts having discharge ends connected in communication with the trash and nut ducts rearwardly from the forward ends of the trash and nut ducts, the auxiliary duct carried by the front suction head and communicating with the trash duct having an inlet end greater in cross sectional area than the inlet end of the other auxiliary duct, so as to develop a suction less than the suction created in the inlet end of said other auxiliary duct.

References Cited in the file of this patent

UNITED STATES PATENTS

| | | |
|---|---|---|
| 1,330,488 | Nelson | Feb. 10, 1920 |
| 2,458,258 | Furr | Jan. 4, 1949 |
| 2,502,810 | Waters | Apr. 4, 1950 |
| 2,699,637 | Nisbet | Jan. 18, 1955 |
| 2,716,856 | Burns | Sept. 6, 1955 |